Patented July 21, 1936

2,048,168

UNITED STATES PATENT OFFICE 2,048,168

NITRATED ORTHO-ALKYL-PHENOLIC COMPOUNDS

John D. Pollard, Baltimore, Md., assignor to Veader Leonard, Baltimore, Md.

No Drawing. Application August 3, 1935, Serial No. 34,627

8 Claims. (Cl. 260—143)

This invention relates to the nitration of ortho-alkyl-phenolic compounds, and the products resulting therefrom, and more particularly to the production of 2,4-dinitro-6-alkyl-phenols and their salts, having the general formula:

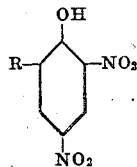

where R represents an alkyl group.

The first or lowest member of the series, namely, 2,4-dinitro-6-methyl-phenol (sometimes referred to as 3,5-dinitro-ortho-cresol) is old, and its activity as a metabolic stimulant has been known for years. Although it has been offered to the public as a pharmaceutical product, it is even more toxic than 2,4-dinitro-phenol itself, and its action is similar, namely, it produces a very sudden, violent and brief stimulation of the metabolic rate.

The general object of the present invention is to devise means for producing in a pure state the higher members of the series, in order to provide new pharmaceutical products for use in stimulating the metabolic rate, which products shall have an improved and much more desirable effect on the animal organism, namely, shall be less toxic and less sudden and violent in their action and which will produce a more gradual and a more prolonged effect.

Suida and Plohn, (Monatshefte für Chemie 1, 175—83) prepared a product which probably contained 2,4-dinitro-6-ethyl-phenol, by dropping ortho-ethyl-phenol into fuming nitric acid. Upon shaking the reaction mixture with water, a "light yellow oil" separated out. They made no further attempts, however, to purify this product or to determine its physical characteristics. As hereinafter described, I have found that the 2,4-dinitro-6-ethyl-phenol in a pure state is a crystalline solid at ordinary temperatures, and not an oil.

When it is attempted to prepare the higher members of the 2,4-dinitro-6-alkyl phenols by using this Suida and Plohn method, it is found that tarring, probably due to extensive decomposition, takes place and the reaction cannot be successfully carried out.

Noelting and De Salis, (Berichte 14, 987) produced 2,4-dinitro-6-methyl phenol by sulfonating ortho-cresol and adding nitric acid to the diluted ortho-cresol-sulfonic acid solution. According to their method, after adding the nitric acid, they subjected the mixture immediately to a gradual heating.

I have found that this method of Noelting and De Salis is unsuitable for the production of the higher dinitrated ortho-alkyl-phenols and the attempts which I have made to produce the higher members of the series by this method have been unsuccessful. Nitrations were always incomplete, the products apparently being mixtures of mono- and dinitrated alkyl phenols, with perhaps some unchanged alkyl phenol present. In no case have I been able to achieve crystallization of the reaction product resulting from the Noelting and De Salis process, either as a means of purification, or for the purpose of determining a melting point. Furthermore, in following the directions given by these prior investigators, I had noted that large amounts of oxides of nitrogen were evolved, and this, of course, is undesirable. Another difficulty which often arises also, when it is attempted to rapidly nitrate phenols having long alkyl side-chains, is the danger of the HNO3 attacking the alkyl side-chain itself, and thus yielding an indeterminate mixture of compounds.

In order to produce the higher members of the series, therefore, I have found it necessary to devise a modification of or improvement upon the Noelting and De Salis method. The principal feature of my improved method consists in this, that while the prior investigators, after mixing the sulfonic and nitric acids, as above referred to, proceeded immediately to heat the mixture, I, on the contrary, subject the mixture to a freezing temperature and allow it to stand for a period of a number of hours before gradually warming up, thus giving the mixture ample time to react. This preliminary nitration period at a relatively low temperature is the novel step which enables me to successfully produce the higher dinitrated ortho-alkyl phenols containing more than two carbon atoms in the alkyl group, where others have failed.

The general procedure which I follow in the dinitration of these higher ortho-alkyl-phenols is briefly as follows:

The ortho-alkyl-phenol is treated with concentrated sulfuric acid in quantity sufficient to contain 50% excess over and above that which would be required to form the mono-sulfonic acid of the phenol. The sulfuric-acid-alkyl-phenol is then heated on the steam bath until the resulting solution is entirely homogeneous. Usually one hour is sufficient, but the time of heating varies with the particular alkyl-phenol employed, that is to say, the more complex the alkyl group, the longer the mixture must be heated. After cooling, a quantity of water equal to the weight of the ortho-alkyl-phenol used is added, and the solution again cooled.

The nitric acid solution, (specific gravity, 1.361) is used in quantity sufficient to contain a weight of HNO₃ 5-10% in excess of that required by theory to dinitrate the alkyl-phenol.

Having cooled the HNO₃ solution in a freezing mixture capable of maintaining a temperature preferably as low as —10° C., the alkyl-phenol-sulfonic acid solution is slowly added to the HNO₃ solution, the addition being so regulated that very little oxides of nitrogen are evolved. The mixture is then allowed to stand preferably over night, or at least ten hours, in the freezing mixture, but no additional materials are added to the latter and consequently the nitrated solution very gradually reaches room temperature, toward the end of the period.

After standing for ten to twenty hours and having, during the latter part of this period, reached room temperature, the solution is heated very gradually on the water-bath. At 50-70° C., the appearance of the solution changes, and oil is rapidly separated. The temperature is then raised to that of the boiling water-bath, and heating continued until no further evolution of oxides of nitrogen is observed. Upon cooling, an oily product collects at the bottom of the reaction vessel. This crude product is washed with distilled water and subjected to steam distillation. The higher dinitro-alkyl-phenols are not volatile with steam, but existing traces of oxidation products which are volatile with steam are thus removed.

The residue from the steam distillation is cooled and the oil separated from the aqueous layer. This oil may be dissolved in alcohol, and upon being sufficiently chilled, the dinitro-alkyl-phenol in most cases crystallizes out and may be separated from the solvent by rapid filtration in the cold.

By way of illustration, the following detailed example of the making of one of these products, namely, 2,4 - dinitro - 6 - normal - butyl - phenol, C₁₀H₁₁(NO₂)₂—OH may be given:

50 grams of concentrated H₂SO₄ (sp. gr. 1.81) is added to 50 grams of pure ortho-n.butyl-phenol, the mixture stirred and then heated on the steam-bath for 1 hour. At the end of this time the solution should be perfectly homogeneous and clear cherry red in color. After cooling, 50 grams of distilled water is added, and the solution again cooled.

80 grams of HNO₃ (sp. gr. 1.361) is placed in a 500 cc., 3-neck flask equipped with a stirrer and dropping funnel. With constant cooling by a snow-salt mixture to below 0° C., the ortho-n.butyl-phenol-sulfonic acid solution is slowly added to the well-cooled HNO₃, contained in the flask and stirred continually. One and one-half hours are usually required for the addition, after which stirring and cooling with fresh snow and ice and salt is maintained for an additional 3 hours. The solution, dark in color, is then allowed to stand in the cooling-mixture over-night, a period of about 16 hours, without the addition of any more freezing materials. At the end of this time, the dark solution has of course warmed to room temperature, and is a decided amber color.

The solution is now placed in a cold water-bath and the water gradually warmed. At around 70-75° C. (temp. of water-bath) a decided transition takes place, with the deposition of a quantity of oil and evolution of considerable oxides of nitrogen. The water-bath is heated on up to boiling, and at the end of one hour from the time heating was first started the flask is removed from the bath. 100 cc. of distilled water is now added, and a quantity of amber oil settles out on the bottom. The oil is washed with several portions of distilled water and then subjected to a vigorous steam distillation. Except for a trace of oil, the product is found to be non-volatile with steam. The residue is separated from the aqueous layer, dissolved in warm ethyl alcohol, and set in the refrigerator to cool. At the end of several hours an abundant crystallization takes place, the product crystallizing in the form of small, well-defined, pale yellow needles. While still chilled, the crystals are rapidly filtered from the solvent and placed in a beaker. After several minutes at room temperature the crystals become liquid.

The oil is now placed in a modified Claisen distilling flask and at water-pump vacuum and water-bath temperature traces of water and solvent are removed. The oil is then distilled carefully at a pressure of 2 mm. Except for a small fore-run and residue, the material distills at 157-158° C. at 2 mm., and is a bright amber refractive liquid at ordinary temperatures. The melting point is about 17°-18° C.

By a similar method, I have produced 2,4-dinitro-6-ethyl-phenol and find that it crystallizes out from ethyl alcohol in the form of yellow needles melting at 35-37° C. It is therefore a crystalline solid at ordinary room temperature. It distills at 130-134° C., at a pressure of 1 mm.

Similarly, I have produced pure 2,4-dinitro-6-normal-propyl phenol, (C₉H₉(NO₂)₂.OH) and find that it crystallizes from ethyl alcohol when chilled, forming yellow needles which melt at 12°-13° C. It boils at 159°-160° C. at 3.5 mm.

By the same process I have also produced pure 2,4-dinitro-6-normal-amyl-phenol

starting with ortho-normal-amyl-phenol. This nitrated product is a dark amber, refractive, viscous liquid at ordinary temperatures, and does not crystallize from alcohol or solidify, even under extreme cold. The distillation point is 153°-154° C. at 1 mm. pressure.

Not only is my improved method applicable to the nitration of normal-alkyl-phenols, as above described, but the iso- and other branch chain compounds can also be synthesized by this process. Thus, working with ortho-iso-butyl and iso-amyl phenols, I have produced pure 2,4-dinitro derivatives thereof.

The 2,4-dinitro-6-iso-butyl phenol,

has the structural formula:

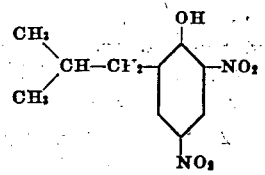

It crystallizes from ethyl alcohol in pale yellow needles, melting at 46°-48° C. Above its melting point, it is a viscous, clear amber liquid, boiling at 135°–140° C., at 1 mm. pressure.

The 2,4-dinitro-6-iso-amyl-phenol, $$(C_{11}H_{13}(NO_2)_2\text{—}OH),$$

having the structural formula:

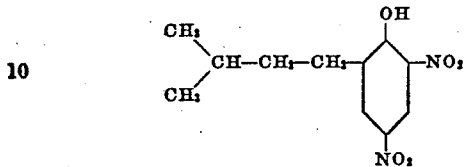

also crystallizes from ethyl alcohol in the cold to form pale yellow needles, but these melt at 17°–18° C., into a clear, bright amber, viscous liquid, boiling at 151°–152° C., at 1 mm. pressure.

In the same way, other ortho-alkyl phenols containing either normal, iso- or branched chain groups, primary, secondary or tertiary, may be successfully nitrated by my method to form pure 2,4-dinitro compounds.

Having once obtained the pure dinitrated alkyl phenols above described, it is a comparatively simple matter to prepare the corresponding salts, such as those of sodium, magnesium, calcium, and other metals.

Thus, I have prepared a number of typical salts corresponding with the various propyl, butyl and amyl compounds.

In making the sodium salts, for example, I dissolve the appropriate dinitro-alkyl-phenol in methanol, warm the solution, and add concentrated sodium hydroxide until precipitation takes place. The precipitate is separated by filtration, and then crystallized from methanol.

I find that the sodium salt of 2,4-dinitro-6-normal-propyl-phenol crystallizes in the form of small, orange plates, and the sodium salt of 2,4-dinitro-6-normal-amyl-phenol crystallizes in the form of golden yellow plates. The sodium salt of 2,4-dinitro-6-isobutyl-phenol crystallizes in the form of brilliant golden yellow scales.

I have also prepared a number of magnesium and calcium salts. In making these, a boiling hot, saturated solution of the dinitro-alkyl-phenol is neutralized with either calcium or magnesium carbonate, the resulting solution boiled for about one hour and filtered. The filtrate is concentrated and allowed to cool, whereupon the salt crystallizes out and is air dried at room temperature.

In this way, I have prepared the calcium salts of the 2,4-dinitro-derivatives of both the normal and iso-butyl-phenols, and find that they crystallize from concentrated aqueous solutions in the form of orange prisms, the former being rather long and irregular in shape and the latter being of finer texture.

As further typical examples, I have also prepared the magnesium salts of these same dinitro-butyl-phenols and find that the magnesium salt of the normal butyl compound precipitates from a concentrated aqueous solution as fine yellow prisms, while the salt of the iso-butyl compound crystallize under similar conditions in the form of spherical clusters of fine yellow needle.

Thus, I have found that practically all of the higher 2,4-dinitro-6-alkyl-phenols and their metallic salts have a yellow, golden, or amber color which appears to be characteristic of this class of compounds.

While I have given specific examples of certain metallic salts which I have prepared, it is obvious that numerous other metallic salts of these dinitro-alkyl-phenols can be prepared in an analogous manner.

So far as I am aware, both the higher dinitro-alkyl-phenols herein described, and their salts are new and valuable products, never before known, and certainly never before produced in a pure state, and I regard both the phenols themselves and their salts as included within the scope of the invention as defined by the appended claims.

What I claim is:

1. As new products, nitrated ortho-alkyl ring compounds having an oxygen in the first position linked with hydrogen or a metal of the group consisting of alkali metals and alkaline earth metals, $NO_2$ groups in the second and fourth positions, and an alkyl group in the sixth position, said alkyl group containing more than two carbon atoms.

2. New products comprising compounds having the general formula—

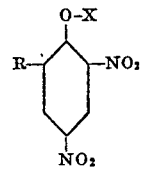

where R is an alkyl group containing more than two carbon atoms, and X is either hydrogen or a monovalent metal.

3. New products comprising 2,4-dinitro-6-alkyl phenols having more than two carbon atoms in the alkyl group.

4. As new products, metal salts of 2,4-dinitro-6-alkyl phenols having more than two carbon atoms in the alkyl group.

5. As new products, substantially pure 2,4-dinitro-6-alkyl phenols having more than two carbon atoms in the alkyl group.

6. As new products, substantially pure 2,4-dinitro-6-propyl-phenols having the formula $$C_9H_9(NO_2)_2\text{—}OH.$$

7. As new products, substantially pure 2,4-dinitro-6-butyl-phenols having the formula $$C_{10}H_{11}(NO_2)_2\text{—}OH.$$

8. The method of nitrating ortho-alkyl-phenols which comprises treating with an excess of sulfuric acid, adding the resulting alkyl-phenol-sulfonic acid solution to a solution of nitric acid at a temperature of 0° to −10° C. allowing the mixture to stand while its temperature rises from this point gradually over a period of at least 10 hours to room temperature, during which period a preliminary nitration occurs, and then heating the mixture to an extent sufficient to effect complete nitration.

JOHN D. POLLARD.

DISCLAIMER 2,048,168.—*John D. Pollard*, Baltimore, Md. NITRATED ORTHO-ALKYL-PHENOLIC COMPOUNDS. Patent dated July 21, 1936. Disclaimer filed June 25, 1938, by the assignee, *Veader Leonard*.

Hereby enters this disclaimer to claims 1, 2, 3, 5, and 7 of said patent.

[*Official Gazette July 26, 1938.*]

DISCLAIMER 2,048,168.—*John D. Pollard*, Baltimore, Md. NITRATED ORTHO-ALKYL-PHENOLIC COMPOUNDS. Patent dated July 21, 1936. Disclaimer filed December 3, 1938, by the assignee, *The Dow Chemical Company*.
Hereby enters this disclaimer to claim 4 of the above-identified patent.
[*Official Gazette December 27, 1938.*]